(12) United States Patent
Huang

(10) Patent No.: US 10,526,178 B2
(45) Date of Patent: Jan. 7, 2020

(54) POWER WINCH OVERCURRENT (OVERLOAD) SAFETY DEVICE

(71) Applicant: Comeup Industries Inc., Taipei (TW)

(72) Inventor: Shih-Jyi Huang, Taipei (TW)

(73) Assignee: Comeup Industries Inc., Taipei (TW)

( * ) Notice: Subject to any disclaimer, the term of this patent is extended or adjusted under 35 U.S.C. 154(b) by 78 days.

(21) Appl. No.: 15/801,369

(22) Filed: Nov. 2, 2017

(65) Prior Publication Data
US 2019/0077642 A1 Mar. 14, 2019

(30) Foreign Application Priority Data

Sep. 14, 2017 (TW) .................................. 106213648

(51) Int. Cl.
| | |
|---|---|
| *B66D 1/58* | (2006.01) |
| *B66D 1/48* | (2006.01) |
| *B66D 1/12* | (2006.01) |
| *H02H 3/00* | (2006.01) |
| *H02H 7/085* | (2006.01) |
| *B66D 1/00* | (2006.01) |

(52) U.S. Cl.
CPC .................. *B66D 1/58* (2013.01); *B66D 1/00* (2013.01); *B66D 1/12* (2013.01); *B66D 1/485* (2013.01); *H02H 3/006* (2013.01); *H02H 7/085* (2013.01); *H02H 7/0856* (2013.01)

(58) Field of Classification Search
CPC . B66D 1/12; B66D 1/18; B66D 1/485; B66D 1/58; H02H 3/08; H02H 7/0853; H02H 7/0858
See application file for complete search history.

(56) References Cited

U.S. PATENT DOCUMENTS

| | | | | | |
|---|---|---|---|---|---|
| 4,334,217 | A | * | 6/1982 | Nield | G01B 7/042 175/45 |
| 4,555,093 | A | * | 11/1985 | Plummer | B66D 1/7447 254/275 |
| 4,965,847 | A | * | 10/1990 | Jurkowski | H02P 23/08 318/366 |
| 5,489,828 | A | * | 2/1996 | Palleggi | B60L 7/003 318/139 |
| 5,662,311 | A | * | 9/1997 | Waedekin | B66C 13/105 254/270 |
| 7,446,433 | B2 | * | 11/2008 | Masciarelli | H02J 9/062 307/66 |
| 8,474,794 | B2 | * | 7/2013 | Liljedahl | A61G 7/1017 254/120 |

(Continued)

*Primary Examiner* — Emmanuel M Marcelo
(74) *Attorney, Agent, or Firm* — Alan D. Kamrath; Karin L. Williams; Mayer & Williams PC

(57) ABSTRACT

A power winch overcurrent (overload) safety device includes a display panel with an overcurrent (overload) warning display zone. Simultaneously, amperages used in the power winch is set with an upper limit current setting value, and a current actual value is set for an actual amperage. The current setting value and the current actual value are displayed on the display panel. A first plug socket is plugged by a plug head of a controller to perform operating of the power winch, and a second plug socket is further disposed on the electrical control set of the power winch and connected to a circuit set for the current setting value in the electrical control set, and which using for the plug of a current regulator to regulate the current setting value.

4 Claims, 4 Drawing Sheets

(56) References Cited

U.S. PATENT DOCUMENTS

| | | | |
|---|---|---|---|
| 9,975,742 B1* | 5/2018 | Mason | B66D 1/46 |
| 2003/0158635 A1* | 8/2003 | Pillar | A62C 27/00 |
| | | | 701/1 |
| 2003/0158640 A1* | 8/2003 | Pillar | A62C 27/00 |
| | | | 701/29.4 |
| 2003/0205703 A1* | 11/2003 | McCormick | B66B 1/32 |
| | | | 254/267 |
| 2009/0160590 A1* | 6/2009 | Maraval | B66C 1/08 |
| | | | 335/291 |
| 2010/0076612 A1* | 3/2010 | Robertson | H02M 5/4505 |
| | | | 700/286 |
| 2016/0046468 A1* | 2/2016 | Heravi | B66D 1/40 |
| | | | 715/835 |
| 2018/0007738 A1* | 1/2018 | Knappenberger | A47J 37/07 |
| 2018/0034266 A1* | 2/2018 | Vasefi | H01M 2/1016 |

* cited by examiner

POWER WINCH OVERCURRENT (OVERLOAD) SAFETY DEVICE

BACKGROUND OF THE INVENTION

Field of the Invention

The present invention relates to a power winch overcurrent (overload) safety device, and more particularly to displaying a current setting value and a current actual value of the power winch on a display panel of the power winch, and an electrical control set of the power winch with a second plug seat capable of being inserted by a current regulator and regulating the current setting value, thereby increasing use safety and convenience of the power winch.

Description of the Related Art

A power winch is a mechanical hoisting device that is used to pull in or let out a cable in order to hoist or put down a heavy object or load. The power winch is also known as a hoist or hoist winch. The conventional power winch is usually installed at a tall building for hoisting or vertically elevating heavy loads or goods or installed on a jeep or buggy for towing other vehicles or for self-rescue (or escape). One side of the conventional power winch has a power source (such as a motor), and power generated by the power source is transmitted by an internal axle to drive a deceleration device disposed on the other side. The deceleration device includes plural levels of deceleration (such as a planetary gear set) and drives a cable pulley to rotate so that the steel cable wound on the cable pulley can perform motions of positive rotation discharging or reverse rotation retracting. In other words, the power winch controls the positive and reverse rotation direction of the cable pulley by power so as to further control the discharging or retracting of the cable pulley with a motion of retracting or discharging the cable pulley. The power winch further includes an electric control set which is generally in form of a box body (called an electric control box) and electrically connected to the power source, and a power supply switch is installed on a surface of the winch body to control conducting (CLOSE) or disconnection (OPEN) between the power source and the external power source (such as a motor vehicle battery). The electric control set may be connected with a wired handheld controller through a plug socket via a wired connection, or the electric control device may be connected to a wireless handheld controller via wireless connection so that when the wired handheld controller or the wireless handheld controller is linked to the electric control set, the effect of remotely turning on/off the power source can be achieved.

The conventional power winch is generally disposed on a motor vehicle and used for rescue and escape purposes. According to experience and the response of users, the conventional power winch still has the following safety issues:

1. When the power winch is used, the voltage of the motor vehicle battery (or storage battery) drops rapidly, and the correct way of using the power winch is to use it only when the users start the motor vehicle engine (in order to charge the battery) to prevent the battery voltage from dropping too low to cause a situation in which a user is unable to start the motor vehicle or safety is affected. In practical applications, many operating persons ignore the importance of starting the vehicle engines since they sometimes may need to deal with an emergency and begin using the power winch to rescue people or cars immediately after closing the switch, forgetting the necessity of starting the motor vehicle. When disaster handling is done, injured people may need to be sent for emergency treatment or hospitalization, and the vehicle is unable to be started. This shortcoming occurs frequently, since it is a normal habit to turn off the power switch before we get out of the vehicle. This habit repeats every day, and rescues do not happen every day, so it is easy to use the power winch without starting the vehicle. Most importantly, the conventional power winch body or its disposition position does not have a device for showing the power level of battery. Consequently, it is difficult to remind users to pay attention to the voltage level of the vehicle.

2. Since the power winch must pull a heavy object by force, the power source (such as a motor) must bear an extremely large torque during its operation, and the temperature may easily rise inside the power source, resulting in an overheating situation. Particularly, when the power winch is used at non-emergency applications of hoisting overweight loads or towing vehicles in a dangerous situation, the current of the power source rises rapidly, and a high temperature or overheating of the power source occurs. However, when the conventional power winch is used, users have no idea about the temperature inside the power source and cannot determine when to pause or stop using the power winch. Consequently, the power source may be overheated and cause a malfunction, wherein the components/parts may be burned or damaged, or even worse, the heavy load falls down accidentally and causes a safety issue.

3. When the power winch is used, the operating person should be the one who knows the cable direction (discharging or retracting) most clearly, but even the operating person may not know the cable direction exactly during an emergency use or in dark conditions. As a result, the operating person may be suddenly confused about the cable direction and cause an incorrect action in operating the power winch, and thus the rescue time may be delayed, or even worse, the safety of the rescued person may be further harmed.

4. The conventional power winch generally comes with a power source switch installed at the body of the power winch to control a CLOSE or OPEN operation between the power source and the external power source (such as a battery of a vehicle). In emergency use or a darkness condition, the operating person may not know whether the electric connection between the power source and the external power supply is at the CLOSE or OPEN status, and the operating person may confuse the operation of the winch or an incorrect action may be taken.

5. When the conventional power winch uses a wireless handheld controller to perform connection and operation, no indication is shown. Consequently, helpers or bystanders sometimes may take improper actions (bypass without caution or turning on the power source accidentally) since they do not know whether the power winch is turned on or off, thus injuring people or damaging equipment.

With respect to many safety concerns for using the power winch, the front surface of the main body of the power winch is designed to include a "display panel". The display panel is electrically connected to the electrical control set of the power winch. The display panel normally includes a power activation display zone displaying that the power winch is at useable state of conducting the power source through a light emitting signal, a vehicle power quantity display zone, at several blocks, displaying power quantity state of the vehicle mounted with the power winch by adopting the light emitting signal, and a temperature warning display zone displaying the warning of stopping operation of the power source through the light emitting signal when temperature of the power source reaches a setting value. Preferably, the display panel of the power winch further includes a steel cable direction display zone adopting gradual jumping light-up through the light emitting signal to display traveling direction of the steel cable, and a wireless operating display zone displaying that the power winch has been transformed into wireless remote control mode through the light emitting signal.

By disposing a "display panel" on the main body of the power winch to clearly display the operation state and related messages during operation of the power winch, the operating person can clearly handle the situation to exactly and greatly improve use safety of the power winch. However, based upon the inventor's design of the power winch and decades of years of practical experiences in manufacturing the power winch, not only the operation state and related messages of the power winch must be clearly displayed on the display panel during actual use but also the "torque value" of the power winch, during operation, is an important message that should be displayed real-time since the purpose of the power winch is to bear heavy burdens. A "torque restriction mechanism" for overload protection is normally disposed inside the power winch so that when overloading occurs, during usage, on the power winch, the transmission mechanism disconnects the power connection to protect the transmission mechanism (such as the motor or the deceleration mechanism) in the power winch so as to prevent malfunction and damage due to excessive overloads. At the same time, a "powerless brake mechanism" is disposed in the conventional power winch to immediately brake the transmission mechanism of the power winch when the power (Perhaps the operating person self-pushes down the stop key to cause stopping or it is stopped due to the effect of the "torque restriction mechanism") is instantly disconnected. Moreover, the heavy burden stays at the height to avoid occurring of inadvertent descending, resulting in danger. The "torque restriction mechanism" is a very important safety mechanism in the process of using the power winch.

In the current practice, the power winch adopts a "current overload protector" as the torque restriction mechanism. The foregoing principle is that when load torque is increased, the current of the power source is also increased, and the torque value and the current value are a linear corresponding relationship. Therefore, setting a current setting value for the power winch is equivalent to setting of torque setting value. When the current of the power winch reaches the current setting value, the torque also reaches a threshold. The power winch is controlled without overload by detecting the current value. However, disposing the "torque restriction mechanism" inside the conventional power winch is merely a passive safety configuration, and normally, a factory provides a current setting value (corresponding to the torque setting value) based upon a power magnitude of the power winch. Each type of power winch has the same current setting value (corresponding to the torque setting value). Moreover, to ensure safety, the factory would enhance safety coefficient for the setting value. While actually operating the power winch, the "torque restriction mechanism" is triggered due to current reaching the current setting value to generate a shut-down effect, and a current value (a torque value) can be used. However, since the power of the power winch has been stopped, the heavy burden can be only suspended in midair or stay at a halfway location of towing the burden. The foregoing situation does not only cause more inconvenience for the operating person, but also affects safety. Thus, immobilizing the current setting value of the conventional power winch may result in inconvenient use and should be overcome.

SUMMARY OF THE INVENTION

In view of the foregoing drawbacks of the prior art, the inventor of the present invention designed and developed a power winch capable of displaying a current setting value and a current actual value in accordance with the present invention to overcome the drawbacks of the prior art.

Therefore, it is a primary objective of the present invention to provide a power winch overcurrent (overload) safety device capable of displaying the current setting value and the current actual value and capable of regulating the current setting value, thereby increasing use safety and convenience.

To achieve the above mentioned objective, the present invention provides with a power winch overcurrent (overload) safety device, a power source disposed on a side of the power winch, with power generated by the power source transmitted by an internal shaft core to drive a deceleration device, the deceleration device driving a cable pulley to rotate after experiencing a deceleration effect so that a steel cable wound on the cable pulley performs motions of positive rotation discharging or counter rotation retracting. The power winch is disposed with an electrical control set electrically connected to the power source to control on or off of the power source, a front surface of the power winch disposed with a display panel electrically connected to the electrical control set to display operation state and related messages of the power winch; characterized in that items of the display panel include an overcurrent (overload) warning display zone setting an upper limit current setting value, which is in connection with use amperage of the power winch, displayed on the display panel and setting a current actual value, which is in connection with an actual amperage of the power winch, displayed on the display panel.

In an embodiment, the power winch overcurrent (overload) safety device includes an external surface of the electrical control set of the power winch disposed with a first plug socket plugged by a plug head of a controller to perform operating of the power winch.

In an embodiment, the power winch overcurrent (overload) safety device includes an external surface of the electrical control set of the power winch disposed with a second plug socket plugged by a plug head of a current regulator to regulate the current setting value.

In an embodiment, the power winch overcurrent (overload) safety device includes items displayed by the display panel including a power activation display zone displaying that the power winch is at useable state as power CLOSE through a light emitting signal, a vehicle power quantity display zone, at several blocks, displaying power quantity state of the vehicle mounted with the power winch by adopting light emitting signal, when power quantity is as low as a setting value, a beep sound is generated at the same time to reinforce the warning, a temperature warning display zone, when temperature of the power source reaches a setting value, displaying at a light emitting signal and beep sound to warn that operation of the power source must be stopped, a steel cable direction display zone adopting gradual jumping light-up through the light emitting signal to display traveling direction of the steel cable, and a wireless operating display zone displaying that the power winch has been transformed into wireless remote control mode through the light emitting signal.

DETAILED DESCRIPTION OF THE PREFERRED EMBODIMENTS

The technical characteristics, contents, advantages and effects of the present invention will be apparent with the detailed description of a preferred embodiment accompanied with related drawings as follows.

Figure 1:
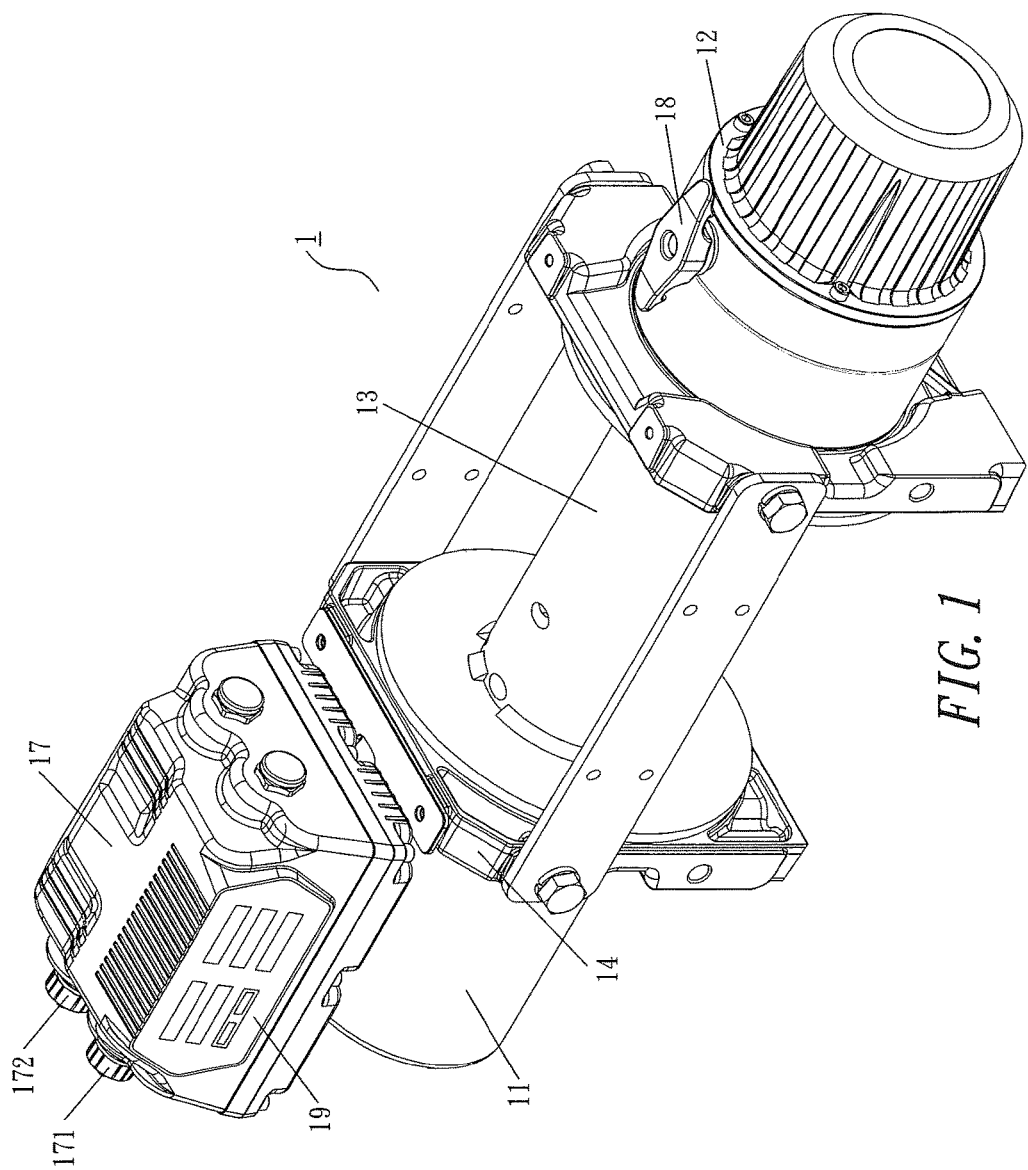
FIG. 1 is a perspective view of an embodiment of the present invention.
Figure 2:
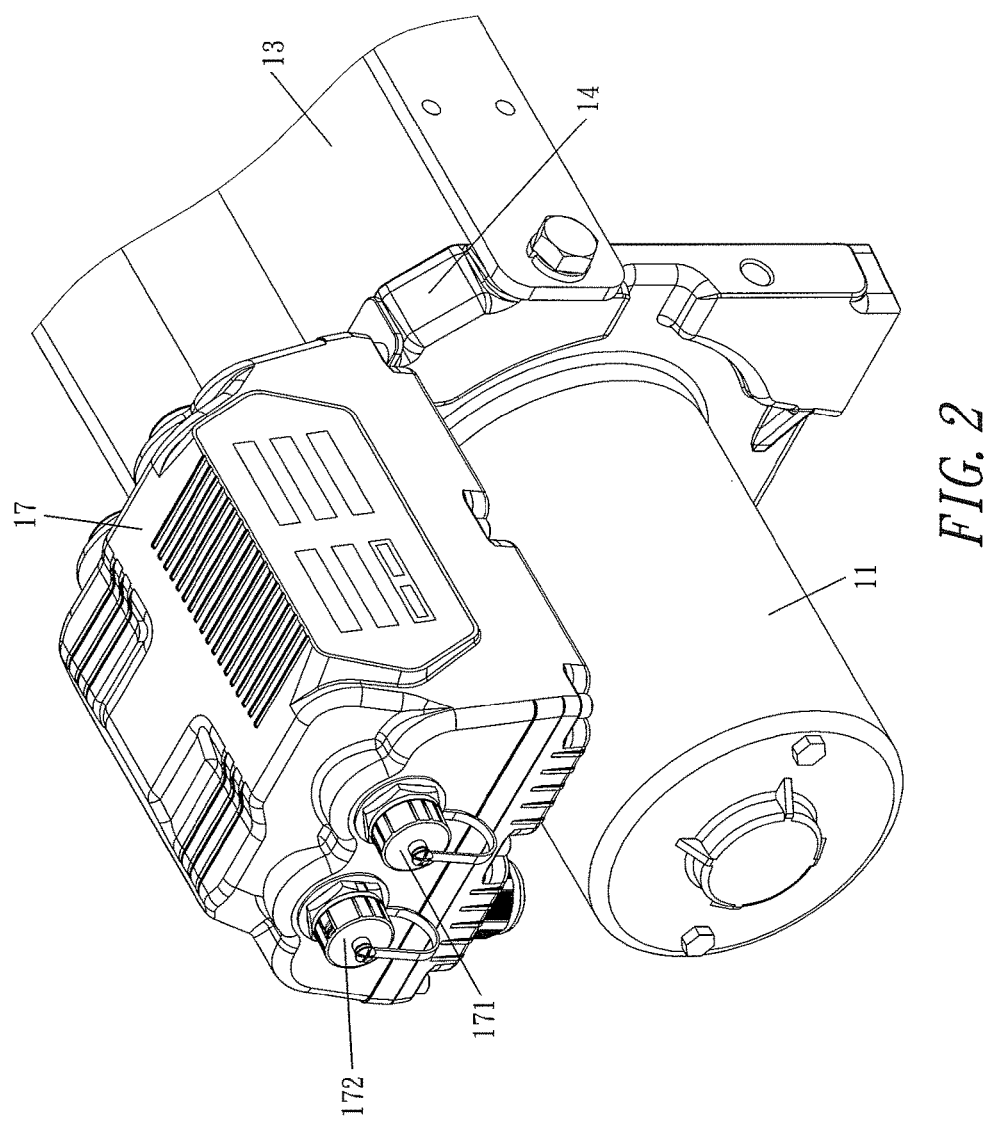
FIG. 2 is a partially perspective view of an embodiment of the present invention.

With reference to FIGS. 1-2 for a power winch 1 in accordance with an embodiment of the present invention, a side is disposed with a power source (a motor for example). The power generated by the power source 11 is transmitted by a shaft core (not shown in the figure) therein to drive a deceleration device 12 disposed at another side to active. The deceleration device 12 finally drives a cable pulley 13 to rotate after internally experiencing several levels of deceleration effects (deceleration of planetary gear set) so that a steel cable (not shown in the figure) can perform a motion of positive rotation discharging or reversion retracting. The cable pulley 13 is supported by a cable pulley rack 14. The power winch 1 must be connected to an external power source and is frequently disposed on a vehicle to connect the power source of the vehicle. If it is disposed at the height to hang heavyweights, the nearly power source (supply mains) is connected. While using AC power or DC power, the power winch 1 must correspond to each other.

With reference FIGS. 1-2, the power winch 1, at the cable pulley rack 14, is disposed with an electrical control set 17 extended above the power source 11. The electrical control set 17 is electrically connected to an external power source guided by the power source 11. The deceleration device 12 is disposed with a clutch device 18 to selectively disconnect power entered into the deceleration device 12 so as to stop driving the cable pulley 13 facilitating a user to stop discharging the steel cable in case of emergency, and the steel cable may be directly pulled by hands to rescue. A side surface of the electrical control set 17 is disposed with a first plug socket 171 and a second plug socket 172. A cover body covers the first plug socket and the second plug socket to achieve a waterproof effect as shown in FIG. 2 while they are not used.

Figure 3:
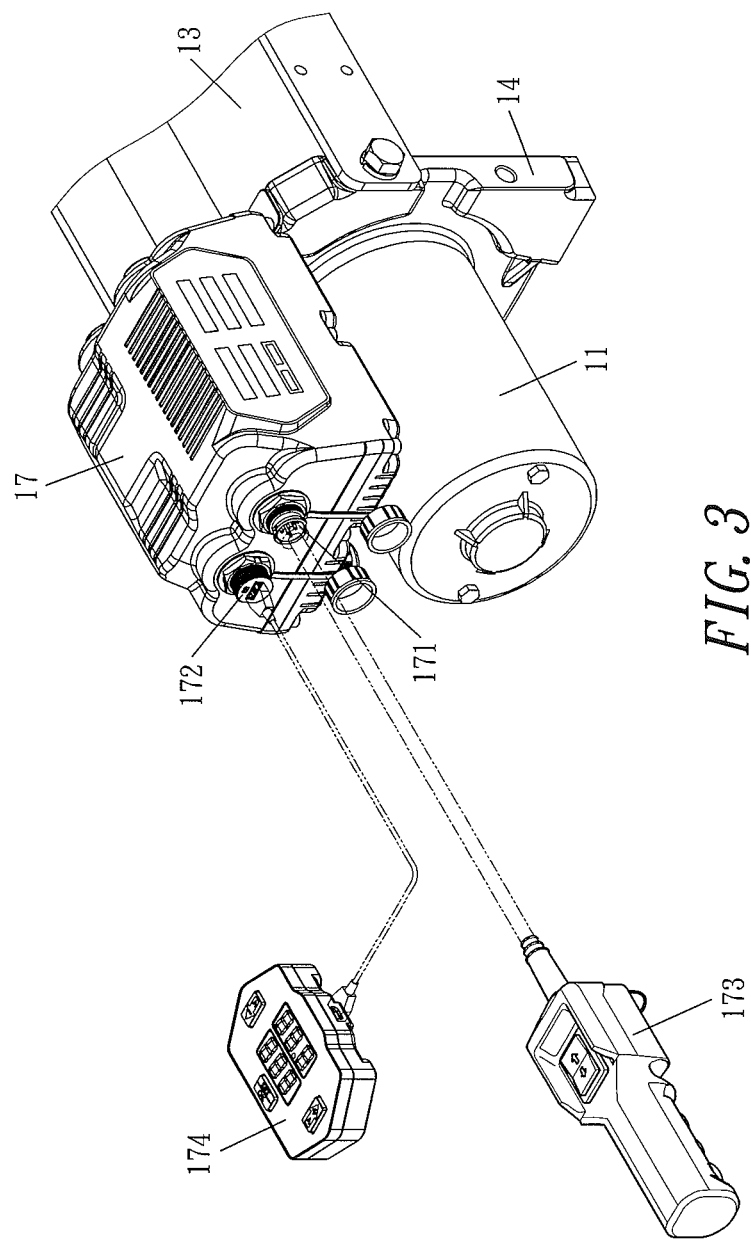
FIG. 3 is a use perspective view of an embodiment of the present invention.

With reference to FIG. 3, the first plug socket 171 can be plugged by a plug of a controller 173 after removing the cover body. The second plug socket 172 can be plugged by a plug of a current regulator 174 after removing the cover body. The controller 173 can be wired or wireless. When the controller 173 is in wired mode (as an example shown in FIG. 3), a front end of a connection wire attached to the controller 173 has a plug. The plug is inserted into the plug socket 171 while in use. Accordingly, the controller 173 can be electrically connected to the electrical control set 17. Power CLOSE or OPEN between the power winch 1 and the external power source 17 can be directly controlled by the controller 173. Moreover, rotation direction of the power source 11 (controlling the cable pulley 13) and all items for the power winch 1 that should be controlled can also be controlled. The foregoing is the operation of the power winch 1 by adopting wired control. When the controller 173 is in wireless mode, the wirelessly connected controller 173 is a signal emitter. The wirelessly connected controller must cooperate with a signal receiver while in use. Accordingly, the plug of the signal receiver is directly inserted on the plug socket 171 so that the controller 173 is electrically connected to the electrical control set 17 through the signal receiver. After a control signal emitted by the wirelessly connected controller 173 is received by the signal receiver and operated by the electrical control set 17, it can also control power CLOSE or OPEN between the power winch 1 and the external power source. It can further control the rotation direction of the power source 11 (controlling the cable pulley 13) and all items for the power winch 1 that should be controlled. The foregoing is the operation of the power winch 1 by adopting wirelessly remote control.

Figure 4:
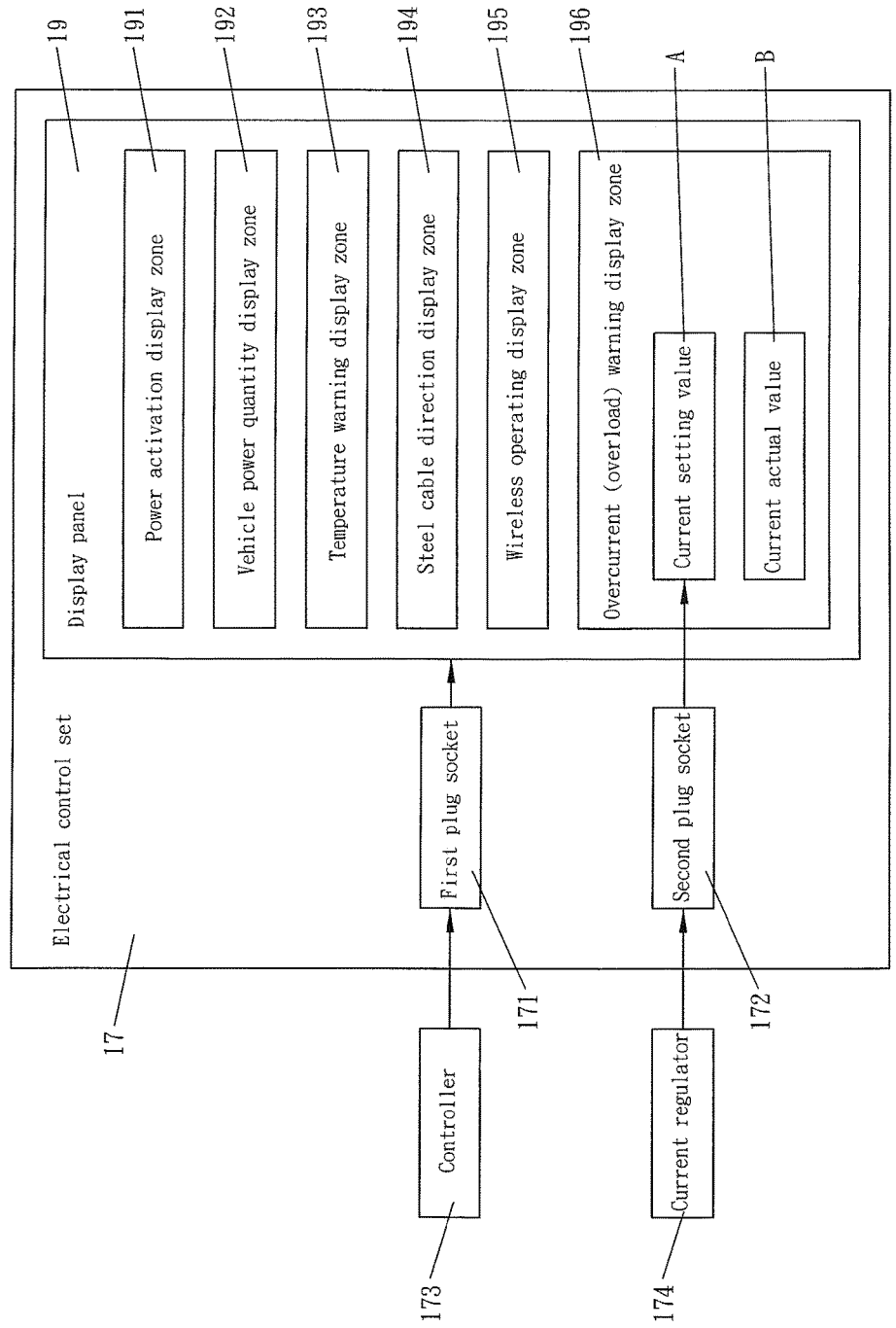
FIG. 4 is an assembled block diagram of display panel in accordance with an embodiment of the present invention.

The power winch 1 is disposed with a display panel 19 on a front surface of the electrical control set 17. The display panel 19 is electrically connected to the electrical control set 17 and receives control of the electrical control set 17 to display the operation state and related messages of the power winch 1 on the display screen so that an operator can clearly handle a situation. As shown in FIG. 4, items displayed by the display panel 19 includes a power activation display zone 191 displaying that the power winch 1 is at useable state as power CLOSE through a light emitting signal, a vehicle power quantity display zone 192, at several blocks, displaying power quantity state of the vehicle mounted with the power winch 1 by adopting a light emitting signal, wherein when power quantity is as low as a setting value, a beep is further generated at the same time to reinforce warning, a temperature warning display zone 193 displaying a warning of stopping operation of the power source 11 through the light emitting signal and a beep sound when the temperature of the power source 11 reaches a setting value, a steel cable direction display zone 194 adopting a gradual jumping light-up through the light emitting signal to display the traveling direction of the steel cable, and a wireless operating display zone 195 displaying that the power winch 1 has been transformed into a wireless remote control mode through the light emitting signal.

In addition, items displayed by the display panel 19 further include an overcurrent (overload) warning display zone 196 setting an upper limit current setting value A in connection with used amperage of the power winch 1 and setting a current actual value B in connection with actual amperage of the power winch 1 and displaying the upper limit current setting value A and the current actual value B on the display panel 19 to allow a user to clearly know how much current (how much torque is used) can be applied in the power winch 1 and how much current has been used (how much torque has been used). The overcurrent (overload) warning display zone 196 is linked to a light emitting signal and beep sound. While normally using the power winch 1 without overloading, the displayed current actual value B should be lower than the current setting value A and the light emitting signal and the beep sound are stopped. When a towing load is overloaded, the current actual value B continuously rises during towing process. When the current actual value B reaches the current setting value A, the light emitting signal and the beep sound are delivered to produce a warning that the process is shutting down instantly. When the current actual value B reaches the current setting value A, a "torque restriction mechanism" disposed inside the power winch 1 is activated to turn off power link after experiencing a short "delay time". At the same time, the power source is turned off to stop the machine. After waiting for a period of "downtime", the power supply is restored, and a user may decide whether or not operation continues or handles the situation.

For example, a factory sets a current setting value A as 350 amperage when one type of the power winch 1 goes out, sets a delay time as three second and a downtime as thirty second. Therefore, a position of the display panel 19 of the power winch 1 regarding current setting value A shows written words of "350 amperage" while a position of current actual value B on the display panel 19 simultaneously displays current actual value B of actually operating the power winch 1. While using the power winch 1, the operating person can know that the upper limit current setting value A of the power winch 1 is "350 amperage" from the position of the current setting value A on the display panel 19. While operating the power winch 1 to tow, the operating person can know current actual value B of the power winch 1 from the position of current actual value B on the display panel 19. If the current actual value B is always lower than "350 amperage", the power winch 1 is not overload and can be used for towing. If the current actual value B, during operation, is really close to "350 amperage", the power winch 1 almost reaches overload and must be used carefully. When the current actual value B rises to reach "350 amperage", the light emitting signal and the beep sound linked to the overcurrent (overload) warning display zone 196 immediately issue a warning. After experiencing a three second period of time (delay time), the "torque restriction mechanism" disposed inside the power winch 1 is activated to turn off power linkage, and the power is turned off to shut down. Power from the power supply is restored after experiencing a thirty second period of time (downtime). However, this load is stopped, and the operating person can decide whether or not operation continues or handle the situation.

The current setting value A is set by factories. To ensure safety, factories would enhance the safety coefficient for the current setting value A. When the current actual value B reaches the current setting value A to trigger the "torque restriction mechanism" to generate downtime, a torque value can be used. Therefore, the current setting value A can be regulated by a current regulator 174. As shown in FIGS. 2, 3, the side surface of the electrical control set 17 is disposed with a first plug socket 171 and a second plug socket 172. Both plug sockets are covered by a cover body to achieve waterproof effect when they are not in use. After removing the cover body, the first plug socket 171 is inserted by a plug head of the controller 173. After removing the cover body, the second plug socket 172 is inserted by a plug head of the current regulator 174. An insertion hole (USB inserting hole for example) is disposed inside the second plug socket 172, and the second plug socket 172 and the electrical control set 17 are connected to the circuit for setting the current setting value A. Therefore, an appropriate operating person (who has certification), when necessary, can retain the current regulator 174 to insert the plug head of connection wire in the insertion hole of the second plug socket 172. The current setting value A can be regulated at the current regulator 174. For example, if the current setting value A is regulated as 400 amperage from original 350 amperage, the power winch 1 can be operated to continuously work without instant shutdown after the power winch 1 is restored with power supply. The operating person can immediately tow load to the destination to complete original stroke. The current regulator 174 can be plugged again to set the current setting value A back to original 350 amperage, thereby ensuring safety of the power winch 1 in use and increasing convenience of using the power winch 1.

It should be noted that the power winch overcurrent (overload) safety device disclosed by the invention includes a display panel disposed at the power winch and further includes an overcurrent (overload) warning display zone setting an upper limit current setting value for used amperage of the power winch and setting a current actual value for actual amperage of the power winch at the same time and displaying the current setting value and the current actual value on the display panel. Simultaneously, the electrical control set of the power winch is further disposed with a second plug socket. The second plug socket and the electrical control set are connected to the circuit for setting the current setting value. A current regulator, when necessary, is plugged in the second plug socket, and the current setting value is regulated by the current regulator. With the power winch overcurrent (overload) safety device disclosed by the invention, the operating person can clearly know that whether or not a towed load is close to overload. Moreover, in case of overload shutdown, the shutdown can be resolved by regulating the current setting value.

Accordingly, the power winch disclosed by the invention not only has innovation and novelty, but also clearly displays the operation state and related messages of the power winch during operation to enhance practical effect of use safety and convenience for the whole power winch.

In summation of the description above, the present invention complies with the patent application requirements. While the invention has been described by means of specific embodiments, numerous modifications and variations could be made thereto by those skilled in the art without departing from the scope and spirit of the invention set forth in the claims.

What is claimed is:

1. A power winch overcurrent (overload) safety device, a side of the power winch disposed with a power source, power generated by the power source transmitted by an internal shaft core to drive a deceleration device, the deceleration device driving a cable pulley to rotate after experiencing deceleration effect so that a steel cable wound on the cable pulley performs motions of positive rotation discharging or counter rotation retracting: the power winch disposed with an electrical control set electrically connected to the power source to control on or off of the power source; a front surface of the power winch disposed with a display panel electrically connected to the electrical control set to display operation state and related messages of the power winch; characterized in that: items of the display panel comprises an overcurrent (overload) warning display zone setting an upper limit current setting value, which is in connection with use amperage of the power winch, displayed on the display panel and setting a current actual value, which is in connection with an actual amperage of the power winch, displayed on the display panel.

2. The power winch overcurrent (overload) safety device according to claim 1, wherein an external surface of the electrical control set of the power winch is disposed with a first plug socket plugged by a plug head of a controller to perform operating of the power winch.

3. The power winch overcurrent (overload) safety device according to claim 1, wherein an external surface of the electrical control set of the power winch is disposed with a second plug socket plugged by a plug head of a current regulator to regulate the current setting value.

4. The power winch overcurrent (overload) safety device according to claim 1, wherein items displayed by the display panel further comprise:

a power activation display zone displaying that the power winch is at useable state through a light emitting signal;

a vehicle power quantity display zone wherein a power quantity state of the vehicle mounted with the power winch is displayed through a light emitting signal, and wherein when power quantity is as low as a power quantity setting value, a beep sound is generated at the same time to reinforce warning;

a temperature warning display zone, wherein when a temperature of the power source reaches a temperature setting value, a light emitting signal is displayed and a beep sound is activated to warn that operation of the power source must be stopped;

a steel cable direction display zone displaying a traveling direction of the steel cable with a light emitting signal; and a wireless operating display zone displaying a light emitting signal indicating that the power winch has been transformed into wireless remote control mode.

* * * * *